US008952889B2

(12) United States Patent
Jacobsen et al.

(10) Patent No.: US 8,952,889 B2
(45) Date of Patent: Feb. 10, 2015

(54) WIRELESS VIDEO HEADSET WITH SPREAD SPECTRUM OVERLAY

(75) Inventors: Jeffrey J. Jacobsen, Hollister, CA (US); Christopher Parkinson, Richland, WA (US); Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 102 days.

(21) Appl. No.: 13/235,937

(22) Filed: Sep. 19, 2011

(65) Prior Publication Data

US 2012/0068921 A1 Mar. 22, 2012

Related U.S. Application Data

(60) Provisional application No. 61/384,580, filed on Sep. 20, 2010.

(51) Int. Cl.
*G06F 3/033* (2013.01)
*G06F 3/01* (2006.01)
*H04W 88/06* (2009.01)
*H04B 1/7143* (2011.01)
*H04M 1/05* (2006.01)

(52) U.S. Cl.
CPC ............... *G06F 3/012* (2013.01); *H04W 88/06* (2013.01); *G06F 3/011* (2013.01); *H04M 1/05* (2013.01); *H04M 2250/02* (2013.01); *H04M 2250/12* (2013.01); *H04B 1/7143* (2013.01)
USPC ............... 345/156; 345/8; 455/465; 375/133

(58) Field of Classification Search
None
See application file for complete search history.

(56) References Cited

U.S. PATENT DOCUMENTS

| 6,223,048 | B1 | 4/2001 | Barreto et al. |
| 6,381,231 | B1* | 4/2002 | Silventoinen et al. ........ 370/332 |
| 8,036,715 | B2* | 10/2011 | Buck et al. ................. 455/569.2 |
| 8,107,510 | B2* | 1/2012 | Ratner et al. .................. 375/133 |
| 2004/0120421 | A1* | 6/2004 | Filipovic ...................... 375/316 |
| 2007/0149261 | A1 | 6/2007 | Haddart |
| 2009/0209205 | A1 | 8/2009 | Kramer et al. |
| 2009/0219224 | A1 | 9/2009 | Elg |

OTHER PUBLICATIONS

International Search Report and Written Opinion of PCT/US11/52161 dated Jan. 18, 2012.
Golmie, N., et al. "Bluetooth Adaptive Frequency Hopping and Scheduling" Military Communications Conference, 2003. MILCOM 2003. IEEE, Oct. 13-16, 2003.

(Continued)

*Primary Examiner* — Jason Olson
(74) *Attorney, Agent, or Firm* — Hamilton, Brook, Smith & Reynolds, P.C.

(57) ABSTRACT

Enhanced Bluetooth and/or cellular frequency hopping radios are integrated into a hands-free wireless mobile computing and video display headset. Forms of these enhanced headsets incorporating the enhanced frequency hopping spread spectrum radio technology are of interest to military, police, fire fighters, first responders and certain commercial companies such as utility companies seeking private cellular systems seeking enhanced communication privacy.

14 Claims, 4 Drawing Sheets

(56) References Cited

OTHER PUBLICATIONS

"Notification Concerning Transmittal of International Preliminary Report on Patentability (Chapter I of the Patent Cooperation Treaty)" from International Application No. PCT/US2011/052161 mailed on Apr. 4, 2013.

Extended European Search Report of PCT/US2011052161 "Wireless Video Headset With Spread Spectrum Overlay" dated Oct. 21, 2014.

* cited by examiner

WIRELESS VIDEO HEADSET WITH SPREAD SPECTRUM OVERLAY

RELATED APPLICATION

This application claims the benefit of U.S. Provisional Application No. 61/384,580, filed on Sep. 20, 2010. The entire teachings of the above application(s) are incorporated herein by reference.

BACKGROUND

A number of applications benefit from the use of untethered, portable video display devices. For example, certain applications for use by industrial workers, soldiers, police or emergency workers in the field require as an objective the ability to display video, untethered from a host platform, to a distance such as 500 meters. This allows a jobsite supervisor or command vehicle to have access to all of the vehicles display information at a range equal to his wireless voice communications.

Such capability should provide for high data transfer rates with minimal latency and transmitted in a secure manner. Anti jamming and anti-spoofing capabilities are also required. This effort may include Radio Frequency (RF) and non-RF solutions. It is important that the technologies considered are power efficient to minimize the load on both Mounted and Dismounted Indusrial Workers, Soldiers, Police and Emergency Workers. This effort should not be a standalone solution, but address the incorporation of this capability as part of an integrated Head-Mounted Display solution.

Type I encryption is expensive in both development and production of industrial, police, emergency or military systems. Because it requires a hardware implementation, it can also significantly impact the power consumption of the system. Current efforts in support of the development of a wireless personal area network for a industrial workers, police, emergency and Ground Soldier Systems focus on a low power implementation of Ultra Wide Band technology. The low range/detectability and anti jamming characteristics of the solution being pursued should not require Type I encryption. However, this approach, increasing the power to meet the range requirements for a Mounted and dismounted industrial workers, police, emergency workers and soldiers, does not scale well.

SUMMARY

An innovative approach is needed to achieve the security requirements for the transmission of classified data without the need for a Type I encryption hardware implementation.

Highly integrated Commercial Off The Shelf (COTS) Bluetooth 2.1 and cellular phone radios already provide on-demand Spread Spectrum Frequency Hopping (SSFH) operation to provide real-time, zero latency, secured streaming video and high data bandwidth communications for dismounted industrial workers, police, emergency workers, soldiers and security forces. Cellular radios and supporting peripheral subsystems (including GPS, Digital compass, Bluetooth, WiFi b, g & n, on-board digital camera, head tracking, etc.) are at absolute state-of-the-art levels of integration and low power consumption.

Bluetooth and global four-band 3G or better cellular radio chipsets are generally capable of operating in any urban location and most remote locations, allowing various workers, police and soldiers to leverage near-by personal or commercial devices and local cellular resources everywhere.

Providing workers, police, soldiers and vehicles with LAN Bluetooth and on-demand SSFH use of cellular frequencies using COTs components, provides very secure level tactical communications and substantial HD streaming video bandwidth between dismounted workers, police, soldiers, vehicles and drones.

In preferred embodiments, a COTS 3G/4G/LTE or WiMAX cellular radio system is therefore modified by software to selectively operate either conventionally or in a SSFH mode on-demand.

In particular, a secondary COTS Bluetooth 2.1 Personal Area Network (PAN) radio with built-in encryption for close proximity sharing of real-time streaming video (720×480p @30 fps) up to 1500 feet can be added. SSFH cellular can be designed to permit industrial, police, emergency and military communications and block standard cellular services when necessary.

In the preferred embodiment, the enhanced Bluetooth and SSFH cellular radios are integrated into a "Hands-Free" wireless mobile computing and communications headset with a large format virtual microdisplay. One example of such a form factor is the Golden-i headset available from Kopin Corporation of Westboro, Mass.

Forms of these enhanced headsets incorporating the enhanced Bluetooth and SSFH radio technology are of interest to military, police, fire fighters, first responders and appropriate commercial companies seeking closed or private cellular systems for security, such as public utility companies.

The wireless video headset can also incorporate auxiliary devices such as low power, optical sensors capable of delivering both visible light, Near-IR, Far IR and/or UV streaming video imaging.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

In a preferred embodiment, a lightweight, a wireless communication video headset having an on-board integrated OMAP processor with off the shelf communication circuitry such as WLAN, Bluetooth and cellular (3G/4G/LTE/WiMax) contains a system software overlay to provide controllable Spread Spectrum Frequency Hopping (SSFH) use of available radio frequencies. This provides very secure level tactical communications and substantial streaming video bandwidth, but still using COTS technologies. The device can be used to communicate between dismounted workers, police, emergency, security, soldiers and vehicles, drones and in other applications. The system can either operate conventionally or in the SSFH mode on-demand.

Suitable headset platforms include the Golden-i™ device available from Kopin Corporation of Westboro, Mass. Golden-i is a lightweight (three to six ounce) Bluetooth/WiFi/Cellular headset with a near-eye 15-inch virtual personal computer (PC) display and near-ear speaker. The Golden-i headset can be adjusted to be used below or above either the left or right eye and comfortably worn with glasses, safety glasses, hard hat or helmet.

On-board Golden-functions include natural speech recognition and six axis gesture sensing, to provide users with hands-free, spontaneous access to virtually any information in the world, on-demand—including digital information, Internet services and broadcast programming such as real-time, full-color high-resolution streaming video. With addition of optional detachable cameras, Golden-i enables the user to record and/or send real-time on-demand still images or streaming video as well.

Users can command and control one or more external devices or network interfaces. Golden-i's features and capabilities are ideal for "hands-free" remote operation in an information "cloud"; users can spontaneously jump on and off remote host devices on-demand, moving and copying data between systems with a simple spoken command or head gesture.

Figure 1:
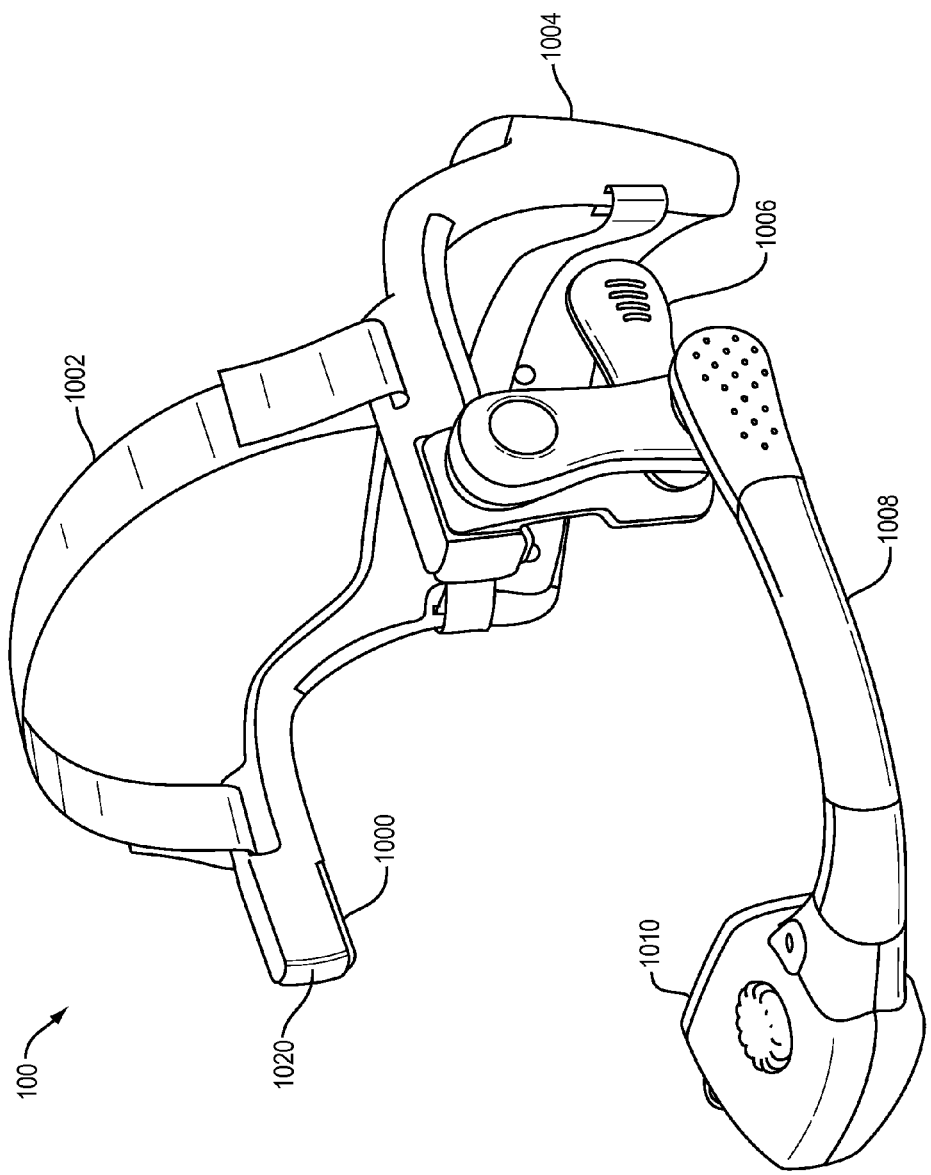
FIG. 1 is a head mounted display (HMD) system that includes a microdisplay as well as other peripheral interfaces.

More particularly, FIG. 1 shows an example Head Mounted Display (HMD) system 100 that generally includes a frame 1000, a strap 1002, a back section 1004, a speaker 1006, cantilever or arm 1008 and microdisplay subassembly 1010. One side of the device, particularly the side opposite the microdisplay subassembly 1010, includes a "hot shoe" peripheral port 1020 that can provide corresponding connections to accessories, as explained further below, so that a user can attach and remove various components to the HMD system 100.

Figure 2:
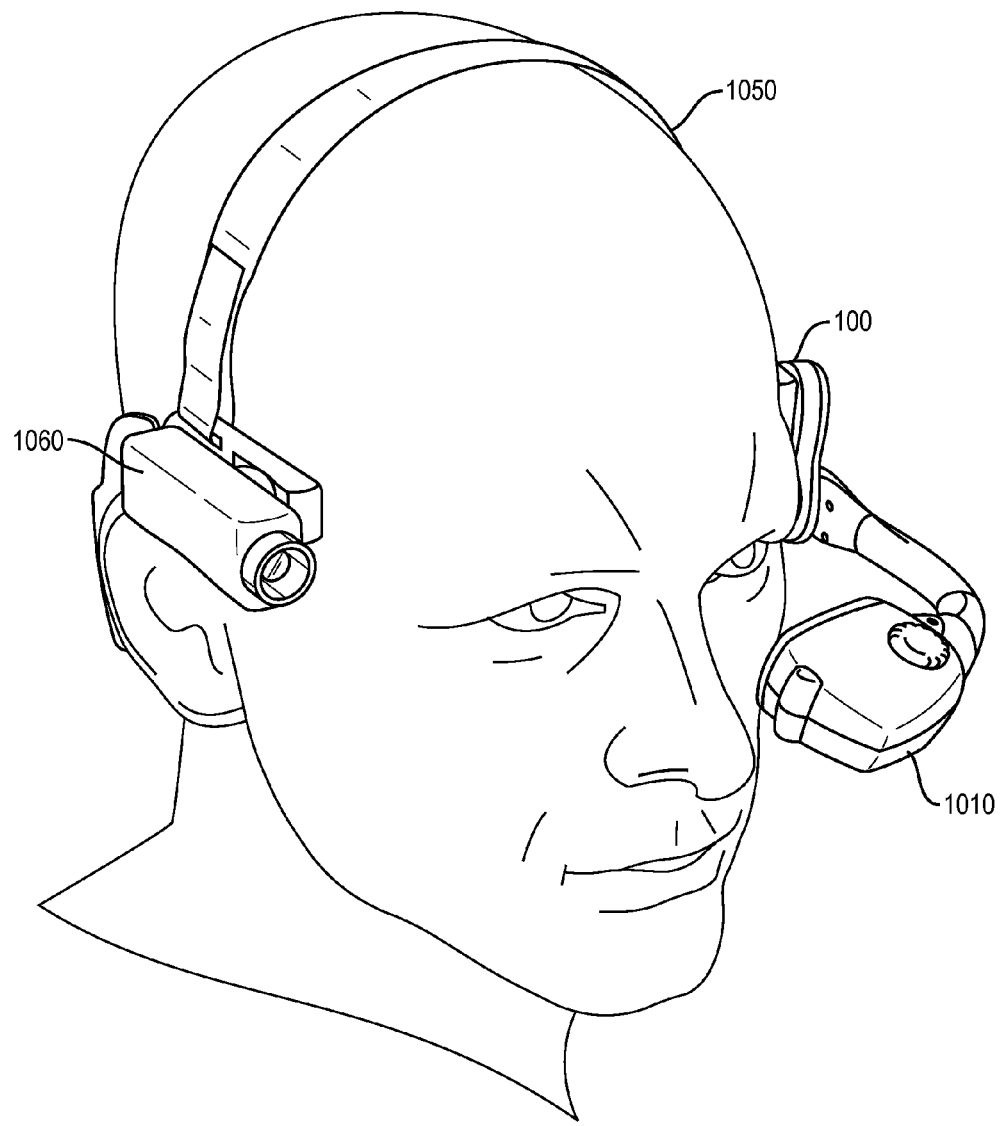
FIG. 2 is another perspective view showing the HMD system as worn on the user's head with a camera peripheral installed.

FIG. 2 is a right side view of the HMD 100 as worn by a user where a camera accessory 1060 has been placed in the port 1020. The camera 1060 can include both audio and video sensing and recording capability. The camera 1060 may for example, have a small form factor similar to a "bullet cam". As will be explained further below, user inputs, which may include head motion(s), hand gesture(s), and/or voice command(s), are provided by the user to control the settings of the display 1010, the camera 1020, and to perform other functions.

The HMD system 100 may operate as a stand alone personal computer (PC)/smartphone device. It may also function as a remote control for a host personal computer. To that end, included in the housing are various electronic circuits, including as will be understood shortly, a microcomputer, one or more wireless interfaces, associated memory or other storage devices, and/or motion sensors. The camera and/or motion sensors are used to track the motion of the user's head or hand gestures and the microphone receives audio input signals.

Figure 3:
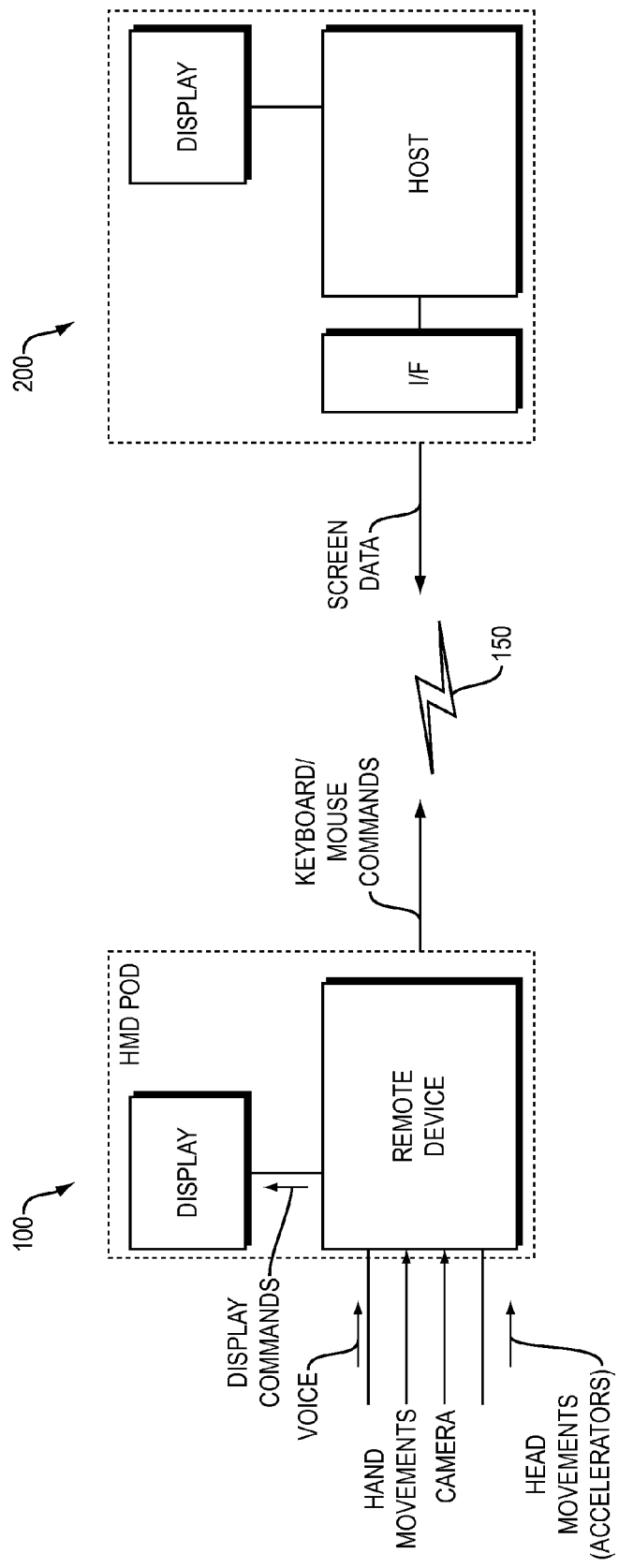
FIG. 3 is a high level functional diagram showing the HMD and its use as a controller for a host processor such as a personal computer.

The wireless interface(s) enable HMD system 100 to be used as a personal computer with wireless network connectivity or as a remote control for a host computing device 200 (see FIG. 3). The host 200 may for example, be a laptop, cell phone, tablet, RIM® Blackberry®, Apple® iPhone®, Google® Android® or other smart phone device having greater computational complexity and greater network connectivity than the HMD system 100 itself. The host 200 may be further connected to other networks, such as through a Wide Area Network (WAN) connection 210 to the Internet. The remote control 100 and host 200 are connected to one another through suitable wireless connections, such as are provided by a Bluetooth link or Wireless Local Area Network (WLAN) 150. The HMD system 100 may provide other functions to other accessories beyond the camera 1060 such as additional speakers, additional cameras, light sources and any other electronic components that may be placed into the hot shoe 1020.

As shown in FIG. 3, the HMD system 100 receives inputs from the user such as voice input via the microphone, hand gestures via the camera or other optical sensors, and/or head movements via head tracking circuitry. These are translated by software in HMD system 100 into keyboard and/or mouse commands. The commands can be interpreted locally by the HMD system 100 or sent over the Bluetooth interface 150 to the host 200. The host 200 then interprets these translated commands in accordance with its own operating system/application software to perform various functions.

Among these commands may be a command to fetch and display a document.

Among other commands may be to retrieve information from the Internet and display it, such as an email or a web page.

Among other commands may be to select a field of view within a virtual display and then return that selected screen to the remote device. In this scenario, a very large format virtual display area may be associated with application software or operating system running on or in the HMD 100 system or application software or operating system running on the host 200. The user may select for viewing on the microdisplay only a portion of that large virtual display area. This field of view can be selected by various voice commands, hand gestures, and/or head movements supplied to the HMD 100. Further information concerning the functions that can be performed by the HMD 100 interacting with the host 200 are explained in a co-pending U.S. Patent application entitled "Remote Control of Host Application Using Motion and Voice Commands" dated May 5, 2010, Ser. No. 12/774,179, Attorney Docket Number 0717.2098-001 by the same inventors, and incorporated by reference herein.

Figure 4:
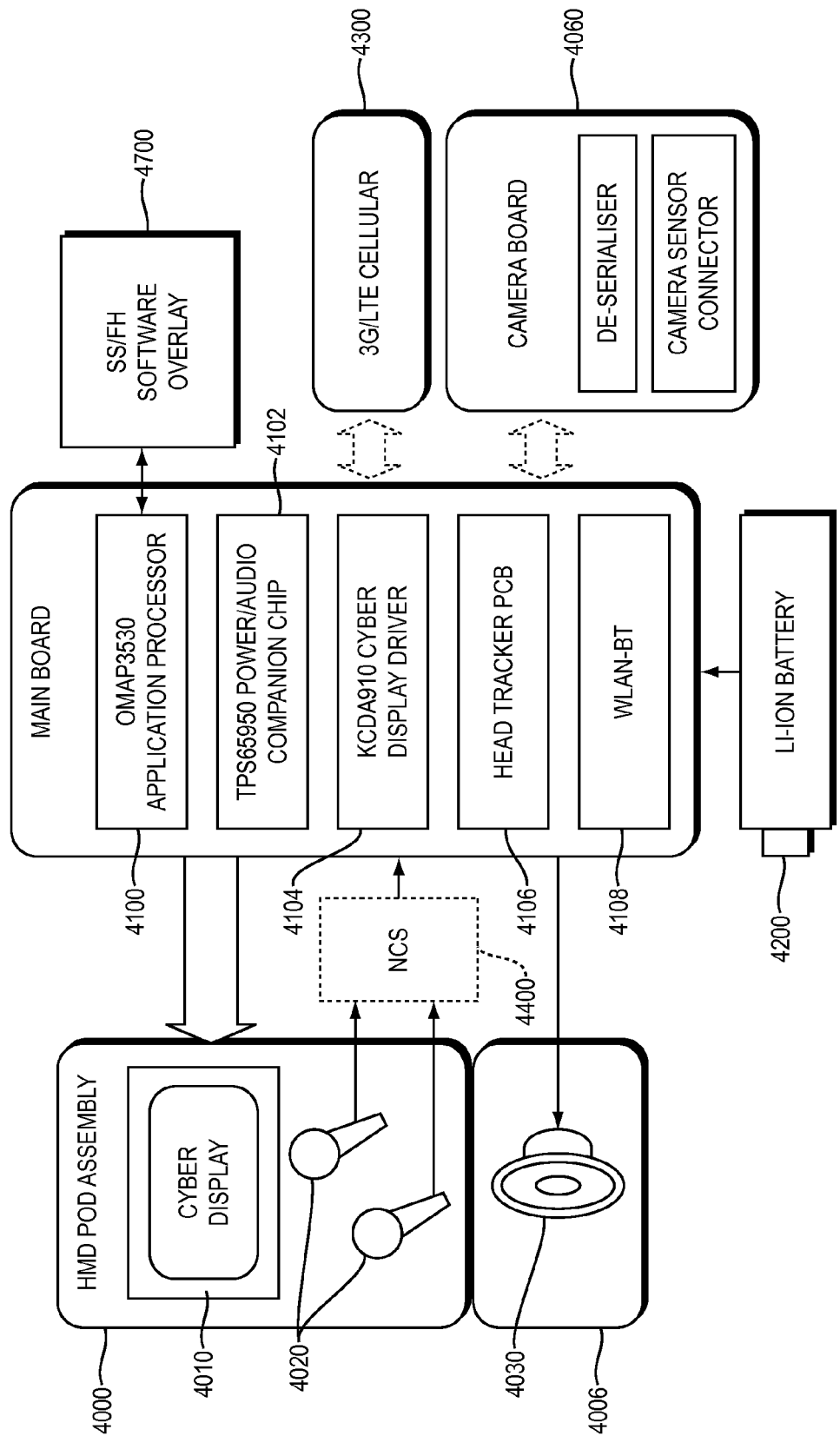
FIG. 4 is a high level block diagram of the components internal to the HMD assembly.

FIG. 4 is a simplified high level block diagram of a non-limiting example embodiment of the HMD system 100. These components are integrated into the HMD housing as shown in FIG. 1. The HMD system 100 may include a pod assembly 4000 that places the aforementioned microdisplay 4010 and one or more microphones 4020 on a boom that can be located near the user's eye(s) and mouth. A separate speaker pod 4006 places speaker(s) 4030 about the users ear(s). Other HMD system 100 electronics are placed on or in the frame in an appropriate location (such as rear portion 1040 in FIG. 1) and include an Open Media Application Platform (OMAP) local processor 4110, a power/audio companion chip 4102, a display driver 4104, a head tracker 4105, a circuit board 4106 and wireless LAN/Bluetooth interface 4108. Also located in the rear housing is a power source, such as a lithium ion battery 4200.

The tracker circuitry 4106 may detect head movements and hand gestures from various sensors. These sensors may include geo-positional sensing, 3 axis to 9 axis degrees of freedom orientational sensors (such as a digital magnetometer), atmospheric sensors, health condition sensors, GPS, digital compass, pressure sensors, environmental sensors, energy sensors, acceleration, position, attitude, motion, velocity or optical sensors, or cameras (visible, infrared, etc.). The camera(s), motion sensor(s) and/or sensor(s) are used to track the motion and/or position of the user's head, hands and/or body in at least a first axis (horizontal), but preferably also a second (vertical), a third (depth), a fourth (pitch), a fifth (roll) and a sixth (yaw).

HMD system 100 may also receive inputs from external input devices such as a wireless mouse, track ball, or keyboard that may be wirelessly connected through the Bluetooth interface 4108.

The OMAP processor may include a central processing unit, and on-chip memory such as Random Access Memory (RAM) that may include non volatile memory and/or Read Only Memory (ROM). The OMAP may be a Texas Instruments model OMAP 3530 processor sold by Texas Instruments, Inc. and used as a multimedia processor. The OMAP may execute an operating system such as an embedded variant of Microsoft Windows®.

In this example, a TPS 65950 power/audio companion chip also available from Texas Instruments, provides audio, USB, keypad control and battery charging functions to the system.

The display driver may be a model KCD-A 910 display driver available from Kopin Corporation of Westborough, Mass. The microdisplay 4010, also available from Kopin, can include CyberDisplay models 113LV, 152LV, 230LV, WQVGA, or other manufactures acceptable micro-displays.

The WLAN/BT interface 4108 may be a model LBEE1W8 NEC-interface, a module available from CSR Ltd. of Cambridge, United Kingdom, or other Bluetooth interface circuits.

The OMAP processor 4100 has a Bluetooth overlay 4700 that interacts with WLAN/BT interface 4108 operate together to allow the user to select one of two possible communication modes. A first mode uses the standard Bluetooth protocols, allowing the HMD device to operate with standard peripherals. However a second mode uses custom frequency hopping spread spectrum (FHSS) patterns to provide increased communication security.

One of skill in the art understands that a standard Bluetooth interface includes four protocol layers, a Bluetooth Core Protocol, a Cable Replacement Protocol (RFCOMM), a Telephony Control Protocol and Adopted Protocols (e.g., PPP, TCP/UDP/IP/OBEX/vCARD/WAP). The Bluetooth Core Protocol stack includes a Baseband, Link Manager Protocol (LMP), Logical Link Control and Adaptation Protocol (L2CAP), and Service Discovery Protocol (SDP) layers.

The Baseband and Link Control layers enable the physical RF link between Bluetooth units to form a piconet. As the Bluetooth Radio system is a Frequency-Hopping-Spread-Spectrum system in which packets are transmitted in defined time slots on defined frequencies, this layer uses inquiry and paging procedures to synchronize the transmission hopping frequency and clock of different Bluetooth devices. The Bluetooth Radio (physical layer) operates in the unlicensed ISM band at 2.4 GHz. The Radio layer employs a frequency hop spread spectrum (FHSS) transceiver to combat interference and fading, and at any given time is using many FHSS carriers selected from a total of 79 available carriers. RF operation uses a shaped, binary frequency modulation to minimize transceiver complexity. The symbol rate is 1 Megasymbol per second (Msps) supporting the bit rate of 1 Megabit per second (Mbps) or, with Enhanced Data Rate, a gross air bit rate of 2 or 3 Mb/s. These modes are known as Basic Rate and Enhanced Data Rate respectively.

During typical operation, a physical radio channel is shared by a group of devices that are synchronized to a common clock and frequency hopping pattern. The group of devices forms a piconet consisting of Master and Slave Devices. One device provides the synchronization reference and is known as the master. All other devices are known as Slaves.

Devices in a Bluetooth-compliant device use a specific frequency hopping pattern which is algorithmically determined by certain fields as defined in the Bluetooth specification(s), such as determined from the address and clock of the Master. The basic frequency hopping pattern is a pseudorandom ordering of the 79 frequencies in the ISM band. Certain later developed Bluetooth standards allow the hopping pattern to optionally be adapted to exclude frequencies that are detected as being used by interfering devices.

When the HMD device 100 is connected to a Bluetooth piconet and becomes the Master device, a decision can be made to operate according to standard Bluetooth frequency hopping patterns allowing interfacing to other COTS devices. However, in a second mode, the HMD device instead executes a custom, private frequency hopping algorithm that is different from the frequency hopping algorithm specified by the Bluetooth standard(s). Alternate frequency hopping algorithms such as those in Golmie, N. et al., "Bluetooth Adaptive Frequency Hopping and Scheduling", Nat. Inst. of Stand. & Technol., Gaithersburg, Md., USA, as appearing in *Military Communications Conference, MILCOM* 2003, 13-16 Oct. 2003 or other custom frequency hopping algorithms may be used in this second mode. Thus software overlay 4700, typically executing within the context of the OMAP, provides additional SSFH functionality to the Bluetooth (and optionally any SSFH cellular radio(s)) used by the HMD system 100. The software overlay 4700 receives user inputs and/or commands from the host, and changes the frequency hopping pseudorandom pattern from a commercial off the shelf pattern to a deterministic, but private pseudrandom frequency hopping pattern. The private frequency hopping pattern can be made available only to specific users of the system 100 and not used by the devices available to the public at large. Such specific users of the enhanced frequency hopping radio technology might include but are not limited to specific members of military, police, fire fighter, and first responder forces, or can be certain commercial companies such as utility companies seeking closed private communication systems. By adopting the private frequency hopping patterns, additional security against eavesdropping and interception is provided.

Similar adaptations can be implemented to provide a selectable private network overly with other LAN or digital cellular (3G/4G/LTE/WiMax) procotols that use frequency hopping spread spectrum.

Mobile Processor Selection

There are several present and near-term advanced low power mobile processor families available from US integrated circuit manufactures other than Texas Instruments, including Intel, Freescale, etc. Examining the streaming video and high bandwidth data performance trade-offs, integration efficiencies, power consumption, industry software and applications support, processor product family roadmap, long-term component availability and ruggedized application packaging support, etc. are all vital considerations in selecting the OMAP processor family.

System OS Selection

While Microsoft Windows® can be used in one embodiment as the Operating System, other OS's can be used. Salability, ease of transition to future and follow-on commercial OS solutions, ability to protect OS from viruses, undesired hacking and tampering, size and scope of applications development based on OS, ease of device application development on standard desk-top PCs or servers and ease of porting new applications to mobile device, long term mobile device OS commercial support, etc. are all significant OS characteristics.

Bluetooth Radio Selection

Bluetooth version 2.1 radios have been demonstrated in a Kopin® Golden-i™ headset operating with a range of 1 mW to 100 mW broadcast power, streaming real-time video at 720×480p resolution at 25 to 30 frames per second (fps) wirelessly over distances ranging from 3 to 300 feet. Later revision Bluetooth radios are expected to provide higher performance.

Cellular Chipset Selection & Base Station SSFH Software

COTS 3G cellular radio chipsets 4300 continue improving and advancing rapidly have been demonstrated in numerous commercial handsets operating at 600 mW broadcast power, streaming real-time video at 720×480p resolution at 15 to 30 fps wirelessly up to 5 miles. With 4G chipsets have come WiMax, LTE and much enhanced cellular streaming video capabilities.

With selection of a cellular radio chipset and private pseudorandom frequency hopping plan, corresponding private base station software for SSFH frequency pattern selection is also integrated into a corresponding base station platform.

Display Selection

Kopin Corporation also provides micro-displays from 0.44 inch diagonal in SVGA (800×600) and XGA (1024×768) resolutions, 0.49 inch diagonal HD (1280×720p) resolution to 0.8 inch diagonal SXGA (1280×1024) resolution. Kopin displays are transmissive LCD, LED backlit displays. There are other display technologies and suppliers who produce streaming video rate capable displays in OLED, DLP, Ferroelectric LCD, etc. display technologies. Each of the technologies deserve a new and up to date evaluation and review for use in mobile low power, "All Weather", all ambient environment use and applications. Their integration capabilities, power consumption, secondary support circuitry requirements, near-eye optical system volume required, inherent rugged application survivability and over industrial and/or military temperature characteristics should all be identified, prioritized and an optimal mobile video capable system display selected.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A portable wireless communication headset comprising:
   a wireless interface that communicates using frequency hopping spread spectrum at a physical layer according to a frequency hopping pattern specified by a commercial standard communication protocol;
   a processor on-board the portable wireless communication headset enabling a user controlled adaptive frequency hopping pattern, the user controlled adaptive frequency hopping pattern being selectively operated on-demand as defined by user command; and
   an input device for a user to selectively enable either the frequency hopping pattern or the adaptive frequency hopping pattern, the input device coupled to the processor in a manner communicating the user command, and the processor responsively selecting one of the frequency hopping pattern and the adaptive frequency hopping pattern according to the user command.

2. The apparatus of claim 1 wherein the adaptive frequency hopping pattern is a custom frequency hopping pattern.

3. The apparatus of claim 1 wherein the commercial standard protocol is a wireless LAN, Bluetooth or digital cellular (3G/4G/LTE/WiMax) procotol.

4. The apparatus of claim 1 wherein the headset further comprises:
   a microdisplay, for displaying visual information received from a local processor;
   a motion detector, for detecting physical movement of a body part of a user, and to provide a motion or gesture input; and
   the local processor located in the apparatus and further comprising:
   a transceiver, for receiving the motion or gesture input;
   a translator, for translating the motion or gesture input to a translated command;
   a display controller, for forwarding information to be displayed on the microdisplay, depending on the motion or gesture inputs.

5. The apparatus of claim 4 wherein the information to be displayed further comprises a visual or audio confirmation of the local processor having translated the motion or gesture input to the translated command.

6. The apparatus of claim 4 wherein the wireless communication interface is further for forwarding the translated command to a host processor, and for receiving a reply from the host processor.

7. The apparatus of claim 1 wherein the adaptive frequency hopping pattern is a private frequency hopping pattern.

8. The apparatus of claim 1 wherein the adaptive frequency hopping pattern is an on-demand frequency hopping pattern.

9. The apparatus of claim 3 wherein the commercial standard protocol is a digital cellular 3G protocol.

10. The apparatus of claim 3 wherein the commercial standard protocol is a digital cellular 4G protocol.

11. The apparatus of claim 3 wherein the commercial standard protocol is a digital cellular LTE protocol.

12. The apparatus of claim 3 wherein the commercial standard protocol is a digital cellular WiMax protocol.

13. A portable communication headset comprising:
   a wireless interface that communicates using frequency hopping spread spectrum at a physical layer according to a frequency hopping pattern specified by a commercial standard communication protocol; and
   a processor on-board the portable wireless communication headset for selectively enabling an additional private frequency hopping-pattern based on user command, in response to the user command, the processor selectively operating on-demand either the frequency hopping pattern or the additional private frequency hopping pattern.

14. The apparatus of claim 13 wherein the headset further comprises:
   a microdisplay, for displaying visual information received from a local processor;
   a motion detector, for detecting physical movement of a body part of a user, and to provide a motion or gesture input; and
   the local processor located in the apparatus and further comprising:
   a transceiver, for receiving the motion or gesture input;
   a translator, for translating the motion or gesture input to a translated command;
   a display controller, for forwarding information to be displayed on the microdisplay, depending on the motion or gesture inputs.

* * * * *

UNITED STATES PATENT AND TRADEMARK OFFICE
CERTIFICATE OF CORRECTION

PATENT NO.         : 8,952,889 B2
APPLICATION NO.    : 13/235937
DATED              : February 10, 2015
INVENTOR(S)        : Jeffrey J. Jacobsen, Christopher Parkinson and Stephen A. Pombo Page 1 of 1

It is certified that error appears in the above-identified patent and that said Letters Patent is hereby corrected as shown below:

In the Claims

Claim 13, col. 8, line 38 please delete "portable communication" and insert --portable wireless communication--

Signed and Sealed this
Twenty-third Day of June, 2015

Michelle K. Lee
*Director of the United States Patent and Trademark Office*